US008682081B2

(12) United States Patent
Hara

(10) Patent No.: US 8,682,081 B2
(45) Date of Patent: Mar. 25, 2014

(54) PATTERN NOISE REMOVAL DEVICE, PATTERN NOISE REMOVAL METHOD, AND PATTERN NOISE REMOVAL PROGRAM

(75) Inventor: Masanori Hara, Tokyo (JP)

(73) Assignee: NEC Corporation, Tokyo (JP)

(*) Notice: Subject to any disclaimer, the term of this patent is extended or adjusted under 35 U.S.C. 154(b) by 57 days.

(21) Appl. No.: 13/321,065

(22) PCT Filed: May 19, 2010

(86) PCT No.: PCT/JP2010/058432
§ 371 (c)(1),
(2), (4) Date: Nov. 17, 2011

(87) PCT Pub. No.: WO2010/134541
PCT Pub. Date: Nov. 25, 2010

(65) Prior Publication Data
US 2012/0057797 A1 Mar. 8, 2012

(30) Foreign Application Priority Data
May 19, 2009 (JP) ................. 2009-121042

(51) Int. Cl.
G06K 9/56 (2006.01)
(52) U.S. Cl.
USPC ........................................ 382/201
(58) Field of Classification Search
None
See application file for complete search history.

(56) References Cited

U.S. PATENT DOCUMENTS

2002/0191829 A1* 12/2002 Sasada ................. 382/132
2007/0104350 A1* 5/2007 Maeno ................. 382/100
2009/0201556 A1* 8/2009 Hara ................... 358/3.28

FOREIGN PATENT DOCUMENTS

| JP | 11-078183 A | 3/1999 |
| JP | 2001-160903 A | 6/2001 |
| JP | 2002-099912 A | 4/2002 |
| JP | 2006-120019 A | 5/2006 |
| JP | 2007-134987 A | 5/2007 |
| JP | 2007-312049 A | 11/2007 |

OTHER PUBLICATIONS

Fingerprint Enhancement by Spectral Analysis Techniques. Teddy Ko. 2002 IEEE.*

(Continued)

Primary Examiner — Stephen R Koziol
Assistant Examiner — Delomia Gilliard
(74) Attorney, Agent, or Firm — Sughrue Mion, PLLC

(57) ABSTRACT

Disclosed is a pattern noise removal device for removing background pattern noise having periodicity from a digital image, which includes a candidate pixel extracting module for extracting candidate pixels that constitute the background pattern noise from the pixels in the image on the bases of the concentration of each of the pixels, a dot pattern feature extracting module for extracting the feature of a dot pattern formed by each of the candidate pixels and the peripheral neighborhood pixels among the extracted candidate pixels, a dot pattern area extracting module for extracting a dot pattern area including the candidate pixels of the periodicity and the neighborhood pixels, which have the feature of the dot pattern, and a periodic pattern noise removal module for removing the candidate pixels of the periodicity and the neighborhood pixels, which are included in the dot pattern area, as the background pattern noise.

9 Claims, 16 Drawing Sheets

(56) References Cited

OTHER PUBLICATIONS

Michael Cannon, et al., "Background pattern removal by power spectral filtering", Applied Optics, Mar. 15, 1983, pp. 777-779, vol. 22. No. 6.

Lin Hong, et al., "Fingerprint Image enhancement: Algorithm and Performance Evaluation", IEEE Transactions on Pattern Analysis and Machine and Intelligence, 1998, pp. 1-30.
ANSI/NIST-ITL-1-2000 Data Format for the Interchange for Fingerprint, Facial, & Scar Mark & Tattoo (SMT) Information, American National Institute of Standards and Technology.

* cited by examiner

LATENT FINGERPRINT IMAGE GI

EXTRACTION RESULT OF DOT
CANDIDATE PIXELS DC DC

DOT CANDIDATE
PIXELS

FINGERPRINT
IMAGE ENLARGED
VIEW

EXTRACTION OF DOT PATTERN FEATURE

GRATING-FORM
RELATION WITH
NEIGHBORHOOD
PIXELS

DOT PATTERN PIXELS (GRATING-FORM FEATURE PIXELS) DP

DOT PATTERN ROTATING
REFERENCE ANGLE

DOT PATTERN ROTATING
ANGLE 30 DEGREES

DOT PATTERN ROTATING
ANGLE FEATURE CHART

DOT PATTERN CATEGORIZED EXAMPLE CA

EXTRACTION OF DOT PATTERN CATEGORIZED AREA DA

CATEGORY
CORRESPONDING TO 71

CATEGORY
CORRESPONDING TO 72

POWER SPECTRUM OF FIRST CATEGORY AREA 71

FIRST CATEGORY AREA (71) PERIODIC NOISE REMOVAL NR

FINGERPRINT IMAGE OF
CATEGORY 71

NOISE REMOVED IMAGE OF
CATEGORY 71

SYNTHESIZED NOISE REMOVED IMAGE
(AFTER COMPLETING FIRST CATEGORY 71) GC

PERIODIC NOISE REMOVAL AND IMAGE SYNTHESIS OF
SECOND CATEGORY AREA (72)

FINGERPRINT
IMAGE OF
CATEGORY 72

NOISE REMOVED
IMAGE OF
CATEGORY 72

SYNTHESIZED IMAGE GC2 OF
CATEGORY 72

FINAL DOT NOISE REMOVED IMAGE GO

INPUT IMAGE

POWER SPECTRUM

NOISE REMOVED IMAGE

INPUT IMAGE

POWER SPECTRUM

NOISE REMOVED IMAGE

PATTERN NOISE REMOVAL DEVICE, PATTERN NOISE REMOVAL METHOD, AND PATTERN NOISE REMOVAL PROGRAM

CROSS REFERENCE TO RELATED APPLICATIONS

This application is a National Stage of International Application No. PCT/JP2010/058432 filed May 19, 2010, claiming priority based on Japanese Patent Application No. 2009-121042 filed May 19, 2009, the contents of all of which are incorporated herein by reference in their entirety.

TECHNICAL FIELD

The present invention relates to a system which processes a digital image having a large amount of background noise such as a latent fingerprint image by using a computer.

BACKGROUND ART

In general, a fingerprint constituted with a large number of stripe-pattern ridgelines has two significant features such as being unchanged through one's life and being different for every person. Thus, it has been utilized as a means for crime investigations from the old times. In particular, collation using a latent fingerprint remained in a crime scene is an effective means for investigations. A fingerprint matching system utilizing a computer is employed in many police organizations to conduct latent fingerprint matching.

However, many of the latent fingerprint images are of low quality and contain a noise, so that examinations thereof by experts are difficult to be done. Further, it is a major factor of an obstruction for achieving automation. There are various kinds in the noise of the latent fingerprint. Among those, there is a dot pattern noise in which dots are lined in a grating form at an equal interval.

As an example of the case where the dots are lined in a grating form at an equal interval, there is a case where a latent fingerprint remains on the dots of a check or a picture area of newspaper, for example.

A set of such dots is printed in order to increase the density of the picture area, and those dots are disposed in a grating form at an equal interval (here, this is called a dot pattern; a dot pattern may sometimes be called a screentone). Hereinafter, the noise constituted with a dot pattern is called as a dot pattern noise.

As shown in FIG. 4, there is a case where fingerprint ridgelines of a latent fingerprint remain on a print part of a check and a dot pattern noise appears noticeably. In such case, the dot pattern noise becomes a factor of obstruction, thereby making it difficult to extract the fingerprint ridgelines accurately.

Further, as a related technique for removing the pattern noise having periodicity, it is common to employ the Fourier transformation. This technique is disclosed in Non-Patent Document 1, for example.

FIG. 15A to FIG. 15F show examples of a case where a dot pattern noise is removed by using the method of Non-Patent Document 1.

Note here that FIG. 15A, FIG. 15D are input images, FIG. 15B, FIG. 15E are power spectral images on a Fourier transformation plane, and FIG. 15C, FIG. 15F are images showing a case where periodic background noise is removed by reducing the peak components of the power spectral image and inversely transforming the result thereof by the method depicted in Non-Patent Document 1.

In the power spectral images shown in FIG. 15B and FIG. 15E, coordinates closer from the origin show lower frequency components, while coordinates farther form the origin show higher frequency components. Further, the density of the pixels shows the intensity (power) of the frequency component at that coordinate.

Further, there is an entirely uniform dot pattern noise exists in the input image shown in FIG. 15A. Thus, in the power spectral image shown in FIG. 15B, the intensity of the frequency components of the dot pattern noise in the power spectrum becomes extremely large.

With the method depicted in Non-Patent Document 1, a large-intensity component is supposed as a frequency component of a periodic noise and it is decreased. As a result, in the background noise removal result shown in FIG. 15C, it is shown that the noise components are removed effectively.

However, as the input image of FIG. 15D, when there is the dot pattern noise of a different feature existing in the processing-target area of a latent fingerprint, the intensity of the noise components on the power spectrum of FIG. 15E becomes weak. That is, compared to FIG. 15B, the peak components of the intensity of the dot pattern noise are dispersed. As a result, removal of the noise components in the background noise removal result shown in FIG. 15F becomes insufficient.

Further, FIG. 16A and FIG. 16B show a case where a printed character is contained in the processing target area. FIG. 16A is an input image, and FIG. 16B shows an image from which the periodic background noise is removed by the method depicted in Non-Patent Document 1.

According to this, it can be seen that a new noise pattern that is not present in the input image is generated in the printed character part of FIG. 16B due to a side effect of removing the periodic background noise, and that the quality for discriminating the printed character part and a fingerprint is deteriorated because of the generated noise pattern.

Further, as a related fingerprint ridgeline enhancing method, there are disclosed various methods which extract the direction and periodicity of a local ridgeline and enhance it by filtering processing that matches the extracted direction and periodicity (Patent Document 1, Non-Patent Document 2).

Patent Document 1: Japanese Unexamined Patent Publication 2002-99912
Patent Document 2: Japanese Unexamined Patent Publication 2001-160903
Patent Document 3: Japanese Unexamined Patent Publication 2007-312049
Patent Document 4: Japanese Unexamined Patent Publication Hei 11-078183
Non-Patent Document 1: Canon, et al., "Background Pattern Removal by Power Spectral Filtering", Applied Optics, Mar. 15, 1983
Non-Patent Document 2: Hong, et al., "Fingerprint Image Enhancement: Algorithm and Performance Evaluation (1998)", IEEE Transactions on Pattern Analysis and Machine Intelligence, 1998

However, in a case where the related technique disclosed in Non-Patent Document 1 is applied for removing a dot pattern noise of a latent fingerprint image, it is necessary for the dot pattern noise to appear uniformly in a wide range, and the effect thereof becomes limited.

Further, in a case where dot pattern noises of different features (properties) exist adjacently, the concentration degree of the dot pattern noise components on a Fourier transformation plane becomes weak (coarse). Thus, extraction of the noise components becomes difficult, which results in limiting the noise removal effect as well.

Further, there is also such an inconvenience that a side effect such as giving a bad influence on the fingerprint ridgelines is generated in an area without the dot pattern noise, which obstructs extraction of the fingerprint ridgelines.

Further, regarding the related techniques of Patent Document 1 and Non-Patent Document 2, enhancement of the fingerprint ridgeline is not effective in a case where the direction and the periodicity of the fingerprint ridgelines cannot be extracted accurately due to an influence of the dot pattern noise. Thus, the fingerprint ridgelines cannot be enhanced in a fine manner.

Further, Patent Documents 2 to 4 limit the existence of the noise and the area thereof, and perform removal of the noise that matches the feature of the noise by limiting it to the noise area. Those techniques do not intend to avoid a bad influence imposed upon the other areas than the noise area.

An object of the present invention is to provide a pattern noise removal device, a pattern noise removal method, and a pattern noise removal program, which effectively remove a periodic background pattern noise such as a dot pattern from a fingerprint image.

DISCLOSURE OF THE INVENTION

In order to achieve the foregoing object, the pattern noise removal device according to the present invention is characterized as a pattern noise removal device which removes a background pattern noise having periodicity from a digital image, and the pattern noise removal device includes: a candidate pixel extracting module which extracts candidate pixels that constitute the background pattern noise from pixels within the image based on density of each of the pixels; a dot pattern feature extracting module which extracts a feature of a dot pattern formed by each of the candidate pixels and peripheral neighborhood pixels among the extracted candidate pixels; a dot pattern area extracting module which extracts a dot pattern area including the periodic candidate pixels and neighborhood pixels having the feature of the dot pattern; and a periodic pattern noise removal module which removes the periodic candidate pixels and neighborhood pixels included in the dot pattern area as the background pattern noise.

In the above, a case of building the present invention as the pattern noise removal device as hardware has been described. However, the present invention is not limited only to such case. The present invention may be built as a method or a program as software.

When the present invention is built as a method, the pattern noise removal method according to the present invention is characterized as a pattern noise removal method for removing a background pattern noise having periodicity from a digital image, and the method includes: extracting candidate pixels that constitute the background pattern noise from pixels within the image based on density of each of the pixels; extracting a feature of a dot pattern formed by each of the candidate pixels and peripheral neighborhood pixels among the extracted candidate pixels; extracting a dot pattern area including the periodic candidate pixels and neighborhood pixels having the feature of the dot pattern; and removing the periodic candidate pixels and neighborhood pixels included in the dot pattern area as the background pattern noise.

When the present invention is built as software, the pattern noise removal program according to the present invention is characterized as a pattern noise removal program for removing a background pattern noise having periodicity from a digital image, and the program causes a computer to execute: a function of extracting candidate pixels that constitute the background pattern noise from pixels within the image based on density of each of the pixels; a function of extracting a feature of a dot pattern formed by each of the candidate pixels and peripheral neighborhood pixels among the extracted candidate pixels; a function of extracting a dot pattern area including the periodic candidate pixels and neighborhood pixels having the feature of the dot pattern; and a function of removing the periodic candidate pixels and neighborhood pixels included in the dot pattern area as the background pattern noise.

The present invention extracts the feature of the dot pattern noise from an image such as a latent fingerprint, extracts only the dot pattern that matches the feature of the extracted dot pattern as a dot pattern area, and removes a periodic noise from the image within the extracted dot pattern area by using a restricting condition that matches the feature of the dot pattern. Therefore, it is possible to remove the dot pattern noise appropriately.

BEST MODES FOR CARRYING OUT THE INVENTION

Next, basic structural contents of an exemplary embodiment of the invention will be described.

Figure 1:
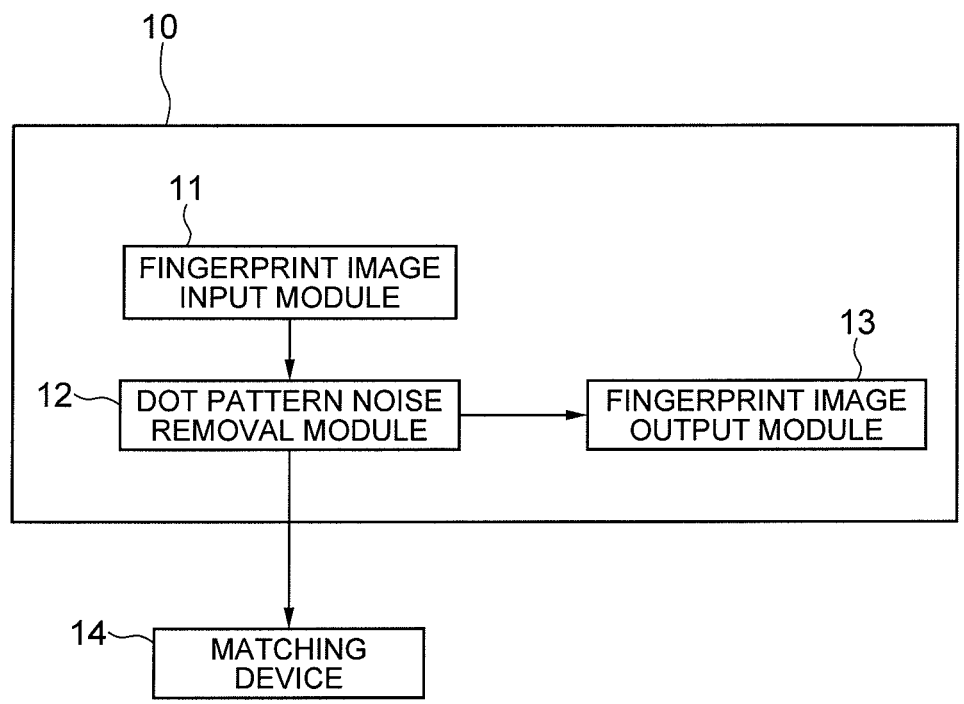
FIG. 1 is a schematic block diagram showing an exemplary embodiment of a fingerprint processing device according to the invention.

As shown in FIG. 1, this exemplary embodiment is an image processing device 10 which includes inside thereof: a fingerprint image input module 11 which digitalizes and inputs a fingerprint image read by a sensor or a scanner into the image processing device 10; a dot pattern noise removal module 12 which removes a dot pattern noise from the fingerprint image inputted by the fingerprint image input module 11; and a fingerprint image output module 13 which outputs the fingerprint image processed by the dot pattern noise removal module 12 to a monitor, a printer, or the like set in advance.

Further, in this exemplary embodiment, a matching device 14 which performs fingerprint matching based on the fingerprint image processed by the dot pattern noise removal module 12 is provided along the image processing device 10. While FIG. 1 shows the structure in which the fingerprint image processed by the dot pattern noise removal module 12 is directly outputted to the matching device 14, the structure is not limited only to such case. The fingerprint image processed by the dot pattern noise removal module 12 may be outputted to the matching device 14 via the fingerprint image output module 13.

The image processing device 10 is a computer provided with a processor, which achieves operating functions of each module such as the dot pattern noise removal module 12 shown below through performing execution processing based on a program set in advance. The program for implementing the operating functions of each module such as the dot pattern noise removal module 12 is recorded on a recording medium and treated as a target of commercial transactions.

The fingerprint image input module 11 has a function of inputting a fingerprint image to the dot pattern noise removal module 12 (an image input function).

Figure 4:
FIG. 4 is an explanatory image showing an example of a latent fingerprint image that is an input image of the fingerprint processing device disclosed in FIG. 1.

Note here that the fingerprint image input module 11 may be set to digitalize and input an image read by a scanner, for example. Further, the fingerprint image input module 11 may input an already-digitalized fingerprint image file to the dot pattern noise removal module 12. A fingerprint image example inputted to the dot pattern noise removal module 12 is defined as GI (FIG. 4). The fingerprint image shown in FIG. 4 is an example of a case where a latent fingerprint remained on a print area of a check is read by a scanner, a sensor, or the like. Further, in the case of the fingerprint image shown in FIG. 4, the space between the dots as the background for printing the check is about 4.5 pixels (dots). However, the space between the dots is not limited only to 4.5 pixels (dots) but is changed variously depending on the dot space of a print area, for example, as the background.

Further, as shown in FIG. 4, the fingerprint image example is acquired by digitalizing a fingerprint image read by a sensor, a scanner, or the like.

Such fingerprint image example is digitalized with the resolution of 500 dpi according to ANSI/NIST-ITL-1-2000 Data Format for the Interchange of Fingerprint, Facial, Scar Mark, & Tattoo (SMT) Information that is standardized by US National Institute of Standards and Technology. This standardized document can be downloaded from a following URL (as of February, 2009).

ftp://sequoyah.nist.gov/pub/nist_internal_reports/sp500-245-a16.pdf

Further, in the digitalized fingerprint image shown in FIG. 4, each pixel is digitalized to have density values of 256 gradations from 0 to 255. Furthermore, expression of the density values is defined with a luminance standard with which the numerical value becomes greater as the luminance becomes higher (brighter).

In this exemplary embodiment, the expression of the density value will be described based on the density standard, i.e., the numerical value becomes greater as the density becomes higher. Thus, it is assumed that a ridgeline part with high density is close to the maximum value of 255, and a paper and a ridgeline groove with low density show a density value close to 0.

Figure 2:
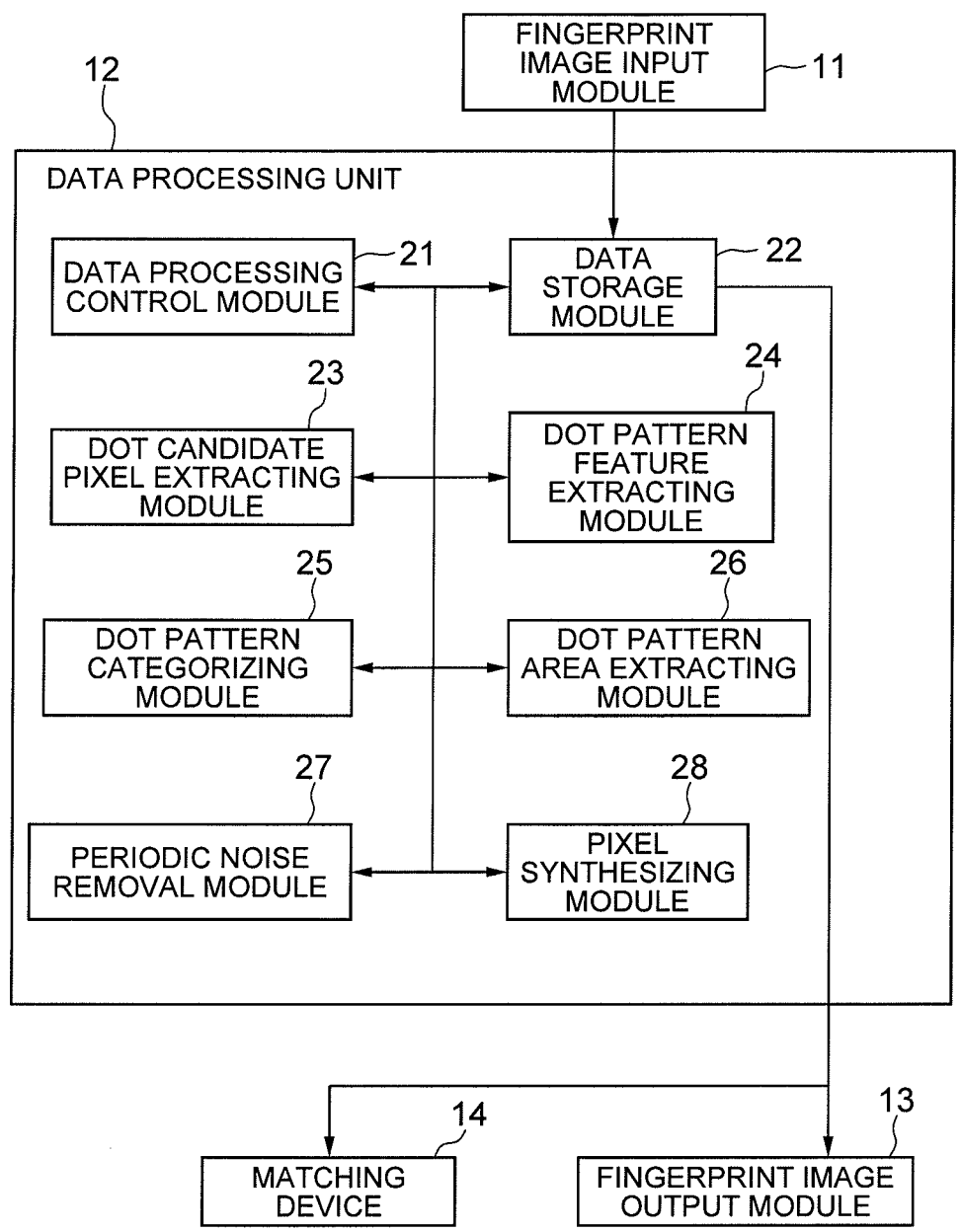
FIG. 2 is a block diagram showing an exemplary embodiment of a dot pattern noise removal module of the fingerprint processing device disclosed in FIG. 1.

As shown in FIG. 2, the dot pattern noise removal module 12 includes: a data processing control module 21 which controls exchange of data and a message between the structural modules within the dot pattern noise removal module 12; a data storage module (storage device) 22 which temporarily stores information calculated by each module and is used as a working area of each module set in advance; and a dot candidate pixel extracting module 23 which extracts pixels that can be the candidates for a dot pattern noise (dot candidate pixels to be described later) by comparing the density regarding each pixel with respect to the neighborhood pixels thereof in the fingerprint image stored in the data storage module 22.

Further, the dot pattern noise removal module 12 includes a dot pattern feature extracting module 24, a dot pattern area extracting module 26, and a periodic noise removal module 27.

The dot pattern feature extracting module 24 has a function which analyzes the pixels that can be the candidates of the dot pattern noise (referred to as dot candidate pixels hereinafter) extracted by the dot candidate pixel extracting module 23, and extracts the feature of the dot pattern formed by each dot candidate pixel and the neighborhood pixels thereof.

In the case of the fingerprint image shown in FIG. 4, the dot candidate pixels that can be the candidate of the dot pattern noise are disposed in a grating form. Thus, the dot pattern feature extracting module 24 judges whether or not the dot candidate pixel and the pixels (the neighborhood pixels) located in the vicinity of the dot candidate pixel are in a grating-form layout relation. When judged as being in the grating-form layout relation, the dot pattern feature extracting module 24 extracts the grating-form layout relation formed by the dot candidate pixel and the neighborhood pixels as the feature of the dot pattern. While the feature of the dot pattern is the grating-form layout relation in the case of the fingerprint image shown in FIG. 4, the feature of the dot pattern is not limited only to the grating-form layout relation. For example, when the grating-form layout relation is tilted on horizontal and vertical coordinates, information regarding the tilt may be added in addition to the grating-form layout relation and extracted as the feature of the dot pattern.

The dot pattern area extracting module 26 further examines the relation between one, two, or more dot candidate pixel (this is referred to as a first dot candidate pixel) and the peripheral dot candidate pixel (this is referred to as a second dot candidate pixel) having the feature of the dot pattern extracted by the dot pattern feature extracting module 24. When judged that those dot candidate pixels have the feature of the dot pattern, the dot pattern area extracting module 26 extracts an area containing the second dot candidate pixel and the first dot candidate pixel as a dot pattern area. Then, the dot pattern area extracting module 26 further examines the relation between the second dot candidate pixel and/or the first dot candidate pixel dot candidate pixel and another peripheral dot candidate pixel (this is referred to as a third dot candidate pixel). When judged that those dot candidate pixels have the feature of the dot pattern, the dot pattern area extracting module 26 expands the dot pattern area to the position of the third dot candidate pixel, and repeatedly performs the above-described processing on the relation between the dot candidate pixel included anew in the expanded dot pattern area or the dot candidate pixel already included in the dot pattern area and the other peripheral dot pixel candidates.

As described above, the dot pattern area extracting module 26 has a function of extracting the final dot pattern area in which a plurality of dot candidate pixels forming the dot pattern noise are captured through taking the area including the dot candidate pixels having the feature of the dot pattern extracted by the dot pattern feature extracting module 24 as the dot pattern area.

The periodic noise removal module 27 has a function of acquiring information of the dot pattern area extracted by the dot pattern area extracting module 26 and information of the feature of the dot pattern extracted by the dot pattern feature extracting module 24, and removing a plurality of dot candidate pixels included in the dot pattern area as the dot pattern noise by having the feature of the dot pattern as a restricting condition.

In a case of the feature of the grating-form layout dot pattern having no tilt on the horizontal and vertical coordinates, there is no specific problem generated because the feature of the dot pattern as the restricting condition for removing the dot candidate pixels of the dot pattern noise from the extracted dot pattern area has commonness. However, in a case of the feature of the grating-form layout dot pattern having tilt on the horizontal and vertical coordinates, the feature of the dot pattern may be different depending on the dot pattern area in some cases. It is because the different feature of the dot pattern by each dot pattern area needs to be taken as the restricting condition because of the tilt.

Thus, the dot pattern noise removal module 12 includes a dot pattern categorizing module 25 and an image synthesizing module 28 as necessary.

The dot pattern categorizing module 25 has a function of analyzing the feature of the dot pattern extracted by the dot pattern feature extracting module 24 by each of the dot pattern areas extracted finally by the dot pattern area extracting module 26, and classifying a plurality of dot pattern areas by each feature of the dot pattern through assembling the dot pattern areas having the common dot pattern feature based on the analysis result. Therefore, each of the classified dot pattern areas comes to have the common dot pattern feature.

As described above, in a case where the dot pattern categorizing module 25 is provided, the periodic noise removal module 27 operates as follows by having the dot pattern area classified by the dot pattern categorizing module 25 as a unit.

That is, the periodic noise removal module 27 has the function of acquiring information of the dot pattern area extracted by the dot pattern area extracting module 26 and information of the feature of the dot pattern extracted by the dot pattern feature extracting module 24, and removing a plurality of dot candidate pixels included in the dot pattern area as the dot pattern noise by having the feature of the dot pattern as the restricting condition.

In the manner described above, removal of the dot pattern noise is conducted by each of the dot pattern areas (referred to as a category area hereinafter) having the common dot pattern. Therefore, a plurality of images having the dot pattern area as a unit are to exist after removing the dot pattern noise.

Thus, the image synthesizing module 28 has a function of synthesizing the plurality of images existing by having the dot pattern area as a unit into a single fingerprint image.

Each of the modules is built on software through executing a computer program by the CPU (Central Processing Unit) of the fingerprint image processing device 10, and the computer program is recorded on a recording medium to be treated as a target of commercial transactions.

Further, each of the modules will be described in a specific manner.

As described above, in a case of providing the dot pattern categorizing module 25, the data processing control module 21 has a dot pattern area set function which sets the dot pattern area of the category area (e.g., area 71 of FIG. 8) as a first category area of the processing target, and an all category completion judging function which judges whether or not there is a dot pattern area of a next category area.

Figure 14:
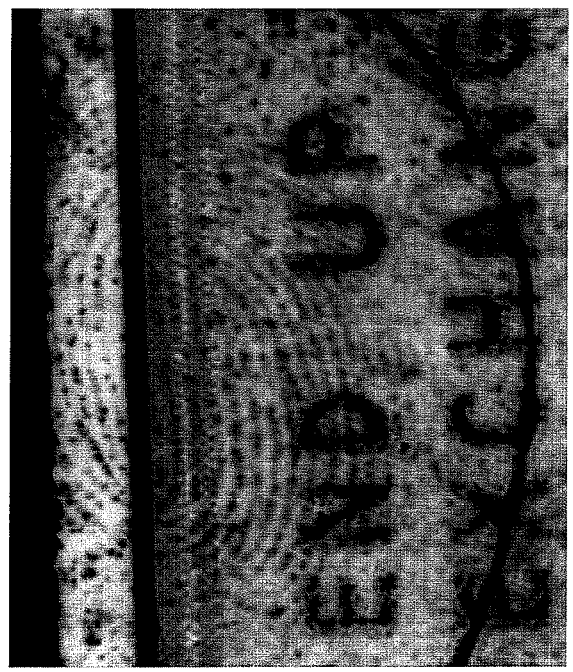
FIG. 14 is an explanatory image showing a final result acquired by performing the dot noise removal processing on the input image of the fingerprint processing device disclosed in FIG. 1.
Figure 15A:
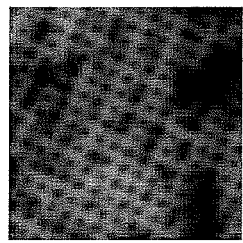
FIG. 15A is an explanatory image showing an example of the input image.
Figure 15B:
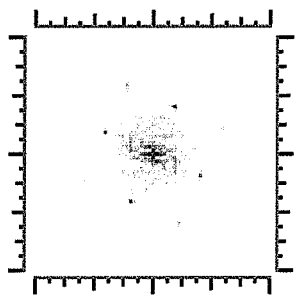
FIG. 15B is an explanatory chart showing a power spectrum of FIG. 15A.
Figure 15C:
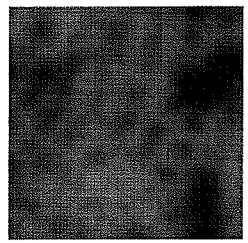
FIG. 15C is an explanatory image showing a result acquired by performing noise removal processing of a related technique on the input image of FIG. 15A.
Figure 15D:
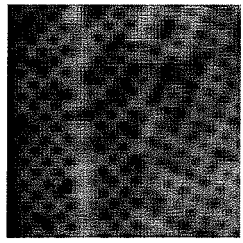
FIG. 15D is an explanatory image showing an example of the input image.
Figure 15E:
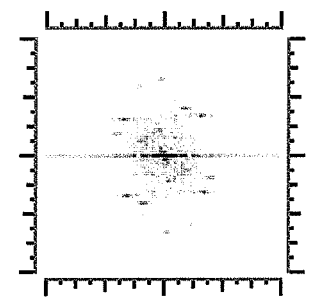
FIG. 15E is an explanatory chart showing a power spectrum of FIG. 15D.
Figure 15F:
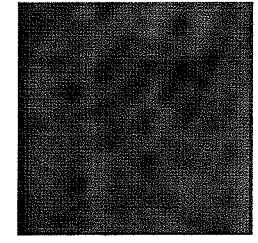
FIG. 15F is an explanatory image showing a result acquired by performing noise removal processing of a related technique on the input image of FIG. 15D.
Figure 16A:
FIG. 16A is an explanatory image showing an example of the input image.
Figure 16B:
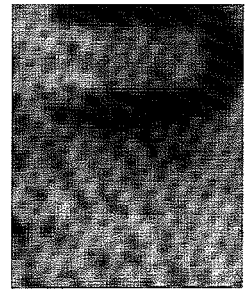
FIG. 16B is an explanatory image showing a result acquired by performing noise removal processing of a related technique on the input image of FIG. 16A.

The data processing control module 21 has an image output control function which controls output of an image GO (FIG. 14) from which the dot pattern noise is removed. This image GO in this exemplary embodiment is a synthesized image GC2 corresponding to the dot pattern area of the final category. The output destination of the synthesized image GO may be the matching device 14 or the like including a feature extracting mechanism as well as the monitor and the printer. The synthesized image GC2 is an image synthesized by the image synthesizing module 28 to be described later.

The data storage module 22 is constituted with a RAM (Random Access Memory), for example, and the storage area of the data storage module 22 is used as an area for temporarily storing the information calculated by each of the modules and working areas of each of the modules such as the dot candidate pixel extracting module 23, the dot pattern feature extracting module 24, the dot pattern categorizing module 25, the dot pattern area extracting module 26, the periodic noise removal module 27, and the image synthesizing module 28.

The dot candidate pixel extracting module (candidate pixel extracting module) 23 analyzes the density of each pixel in the input image data (GI) stored in the data storage module 22, and extracts dot candidate pixels DC that can be the candidate for the dot pattern noise (the candidate pixel extracting function).

Specifically, assuming that a specific pixel in the fingerprint image (input image data GI) as a focused pixel, the dot candidate pixel extracting module 23 compares the concentration of all the peripheral neighborhood pixels that are away from the focused pixel by a prescribed distance with the density of the focused pixel (a density comparing/referring function), and extracts the focused pixel as a dot candidate pixel that can be a candidate for the dot pattern noise when the density value of the focused pixel is larger or equal to the density value of the neighborhood pixels (a candidate pixel extracting function).

In a case of the latent fingerprint image remained on the print area of a check shown in FIG. 4, the dot space of the dot pattern printed on the check is 4.5 pixels as described above (0.225 mm in actual distance) and the size of the dot itself is about 1.5 pixels. Thus, it is found that the focused pixel can be extracted as a dot candidate pixel that can be a candidate for the dot pattern noise through comparing the concentration of the focused pixel and the density of the neighborhood pixel distant by 2 pixels (less than a half of the dot space and more than a half of the dot size) at the maximum from the focused pixel.

In this case, pixels of the neighborhood dots become included when the density of the neighborhood pixel distant from the focused pixel by about 4.5 pixels or more at the maximum is compared. There are some cases where the density of the pixel of the neighborhood dot is higher than the density of the focused pixel. Therefore, it is also found that the focused pixel cannot be extracted as a dot candidate pixel that can be a candidate for the dot pattern noise. The space between the focused pixel and the neighborhood pixel for comparing the density is set to be about 1 pixel. However, when the space between the pixels (dots) for printing on a check, a printed matter, or the like where a latent fingerprint remains is different, the distance (the number of pixels) between the focused pixel and the neighborhood pixel for comparing the density becomes also different.

Further, the dot candidate pixel extracting module 23 analyzes the connectivity (size, diameter, etc.) of the extracted dot candidate in order to increase the accuracy of the extracted pixel being the dot candidate pixel surely when extracting the dot candidate pixel by comparing the density of the focused pixel and that of the neighborhood pixel, and extracts the dot candidate pixel as a final dot candidate pixel DC when the connectivity of the dot candidate pixel is up to 2 pixels (a pixel connectivity analyzing/extracting function).

The reason why the connectivity of the dot candidate pixel is defined as 2 pixels is because it is not possible to identify whether the pixel is the dot candidate pixel DC of the dot pattern noise or the pixel showing the fingerprint when the connectivity exceeds 2 pixels.

Therefore, when the connectivity of the dot candidate pixel is 3 pixels or more, the dot candidate pixel extracting module 23 removes a group of all the connected three pixels including the dot candidate pixel (dot candidate pixels other than the dot candidate pixel DC).

Here, the dot candidate pixel DC extracted in the manner described above is shown in FIG. 5A. The dot candidate pixels DC shown in FIG. 5A are a result acquired by executing processing on the enlarged area shown in FIG. 5B based on the processing order (a focused pixel extracting function and a pixel connectivity analyzing/extracting function: sub-steps 1 to 2).

Figure 5A:
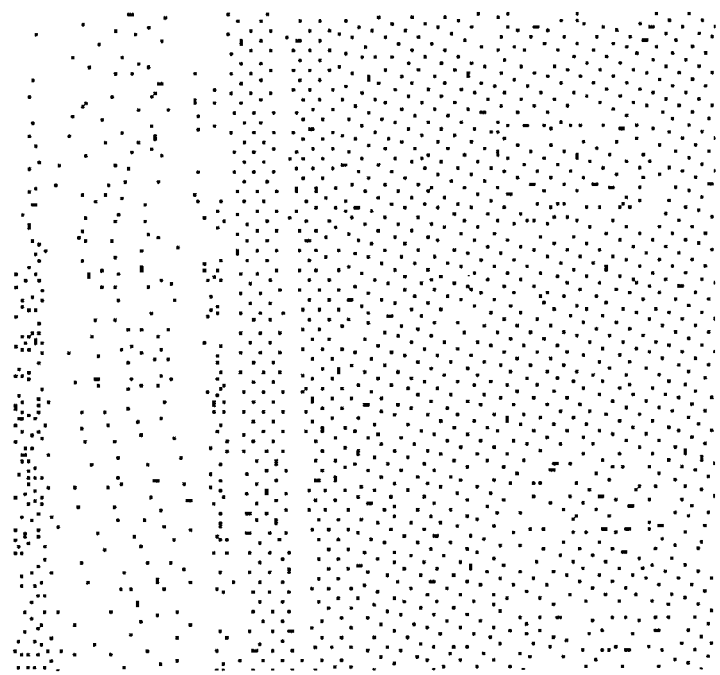
FIG. 5A is an explanatory image showing an example of dot candidate pixels in an area corresponding to FIG. 5B.
Figure 5B:
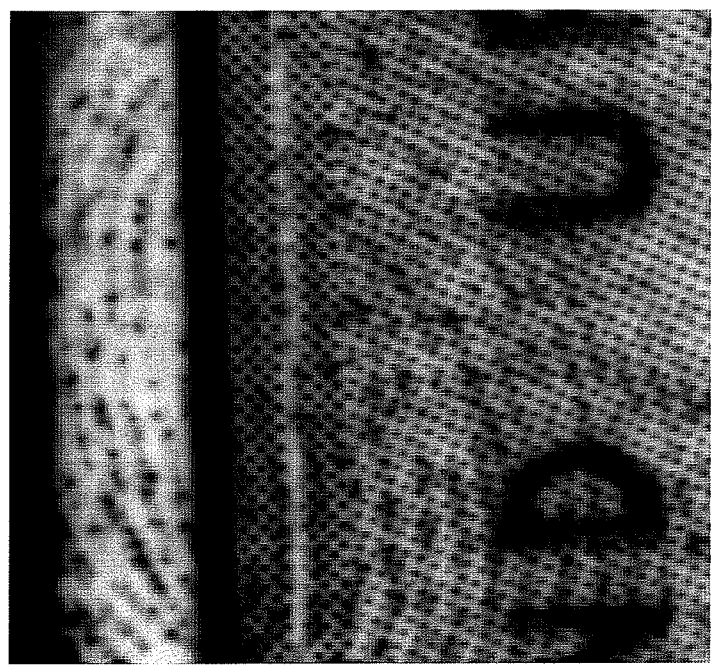
FIG. 5B is a fragmentary enlarged image of the input image disclosed in FIG. 4.

In FIG. 5A, it is shown that many of the pixels (dots) contained in the dot pattern noise are extracted accurately compared to FIG. 5B.

The dot candidate pixel extracting module 23 may be set to generate a contracted image by contracting the fingerprint image to ½, and to extract the dot candidate pixel in the above-described procedure from the contracted image.

Further, the dot candidate pixel extracting module 23 may extract the pixel that is the center of a group of the three or more connected pixels through performing image contraction or core line extraction on the dot candidate pixels instead of removing the group of all the three or more pixels having the connectivity, and extract the extracted center pixel as the dot candidate pixel DC when executing the pixel connectivity analyzing/extracting function.

The dot pattern feature extracting module (a grating-form layout pixel extracting module, a layout feature information detecting module) 24 analyzes the feature of the extracted dot candidate pixel DC, and judges whether or not the relation between a single dot candidate pixel DC among the group of dot candidate pixels and the other dot candidate pixels DC located in the vicinity thereof is considered as a grating-form layout, for example (a grating-form layout judging function).

In a case where it is considered that the relation between a given dot candidate pixel DC and other dot pixels DC located in the vicinity thereof is a grating-form layout and the grating-form layout is tilted on the horizontal and vertical coordinates, the dot pattern feature extracting module 24 extracts the tilt (the dot pattern rotating angle) of the grating-form layout as the dot pattern feature in addition to the grating-form layout (including the dot space and the like between the focused pixel and the neighborhood pixels) (a dot pattern feature extracting function).

The process of extracting the dot pattern feature done by the dot pattern feature extracting module 24 will be described based on FIG. 6A, FIG. 6B, and FIG. 7A to FIG. 7C.

Whether or not the relation between a specific pixel (dot candidate pixel DC) within the inputted image and the neighborhood pixels thereof can be considered as a grating-form layout set in advance can be judged by executing a following processing order (a candidate pixel determining function and a structural pixel setting function: sub-steps 3 to 4). In this explanation, assumed is a case where the grating-form layout has tilt on the horizontal and vertical coordinates as shown in FIG. 6A.

Figure 6A:
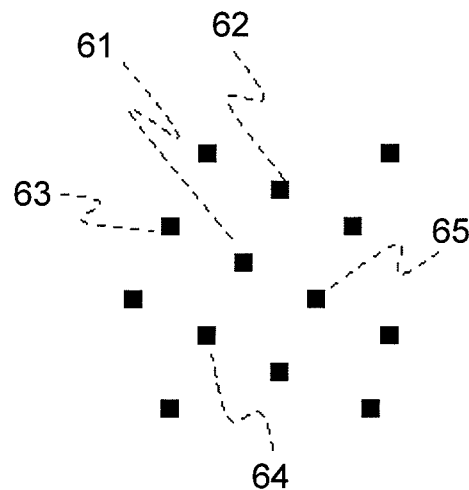
FIG. 6A is an explanatory chart showing a grating-form relationship with respect to neighborhood pixels.

First, when a single dot candidate pixel DC among the dot candidate pixels DC extracted as a result of judgment according to the connectivity is taken as a focused pixel (dot candidate pixel DC61 of FIG. 6A is taken as a focused pixel), the dot pattern feature extracting module 24 determines the dot candidate pixel DC that is closest to the focused pixel (dot candidate pixel DC61).

In FIG. 6A, the closest dot candidate pixel DC62 is defined as a closest pixel 62. When the space between the single dot candidate pixel DC as the focused pixel and the closest dot candidate pixel DC is not equal to or less than a dot space limited value designated in advance (8 pixels in this case), the dot pattern feature extracting module 24 decides that the focused pixel (dot candidate pixel DC 61) is not an element that constitutes the grating-form layout (a candidate pixel determining function: sub-step 3).

Next, the dot space limited value will be described. A dot pattern noise with a space that exceeds the dot space limited value becomes close to a fingerprint ridgeline space, so that the fingerprint ridgeline quality tends to be deteriorated when performing processing for removing the dot pattern noise. In a dot pattern existing in a check or a printed matter from which a latent fingerprint is collected, it is sufficient to set the dot space limited value as 8 pixels or less in terms of actual operations since the fingerprint ridgeline space is about 10 pixels in average. However, when the fingerprint ridgeline space exceeds 10 pixels in average, the dot space limited value may be changed accordingly when removing a dot pattern noise existing on a check or a printed matter from which a latent fingerprint is collected. Thus, the dot limited value is not limited only to 8 pixels or less.

Even when the relation between the focused pixel (dot candidate pixel DC61) and the closest pixel (dot candidate pixel DC62) is judged as being not in a grating-form layout on the horizontal and vertical coordinates, there is a possibility of being a case where the dot candidate pixels DC are in a grating-form layout with respect to each other having tilt on the horizontal and vertical coordinates.

Thus, the dot pattern feature extracting module 24 checks whether or not there are other dot candidates at positions which are equivalent distance with respect to the focused pixel 61 and the closest pixel 62 and are rotated by 90 degrees, 180 degrees, and 270 degrees (referred to as "rotated positions" hereinafter).

When there are neighborhood pixels (dot candidate pixels 63, 64, and 65) forming a grating-form layout having tilt with respect to the focused pixel 61 and the closest pixel 62 in the rotated positions, the focused pixel and the neighborhood pixels satisfy the grating-form layout having tilt (satisfy a grating-form layout condition). Thus, the dot pattern feature extracting module 24 considers those pixels to be in a grating-form layout and sets (determines) the focused pixel 61 and the four neighborhood pixels 62, 63, 64, and 65 as the dot pattern structural pixels (a structural pixel setting function: sub-step 4).

Figure 6B:
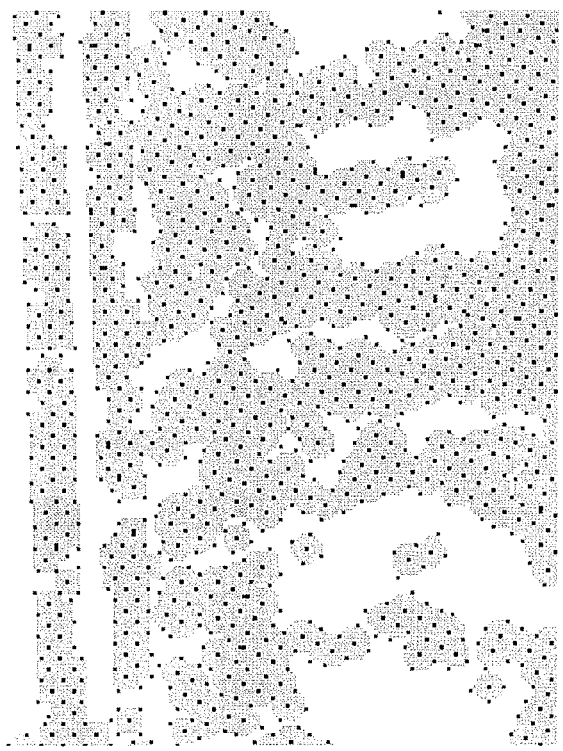
FIG. 6B is an explanatory chart showing an example of dot pattern pixels.

FIG. 6B shows the result acquired by executing the processing based on the processing order (sub-steps 3 to 4) on the dot candidate pixels DC of FIG. 5A (dot pattern pixels DP). In FIG. 6B, it is shown that the dot candidate pixels existed in FIG. 5A are removed from the area of the fingerprint ridgeline and the printed character part.

Then, the dot pattern feature extracting module 24 calculates the dot space between the focused pixel and the neighborhood pixels in order to extract the dot pattern feature of the dot pattern pixels DC (FIG. 6B).

Note here that the dot space of all the dot pattern pixels in the dot pattern pixels DP (FIG. 6B), for example, is about 4.5 pixels.

Further, the dot pattern feature extracting module 24 determines the dot pattern rotating angle in order to extract the dot pattern feature of the dot pattern pixels DP (FIG. 6B) (a dot pattern rotating angle defining function).

Figure 7A:
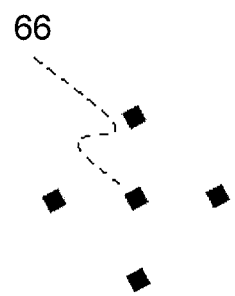
FIG. 7A, FIG. 7B show examples of a dot pattern rotating angle, respectively.

Note here that the dot pattern rotating reference angle as the reference of the dot pattern rotating angle is defined as 0 degree when the four neighborhood pixels are placed in a grating form horizontally and vertically as shown in FIG. 7A, and the dot pattern rotating angle is defined as the tilt (angle) with respect to that.

Figure 7B:
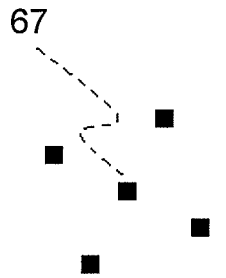

This tilt is defined as a clockwise rotating angle. Further, the dot pattern rotating angle in FIG. 7B is 30 degrees on the basis of the dot pattern rotating reference angle (FIG. 7A).

Further, the dot pattern rotating angle feature chart (FIG. 7C) shows the dot pattern rotating angles calculated based on the dot pattern of FIG. 6B with the density. Here, larger tilt is expressed with a higher density value (darker color).

Figure 7C:
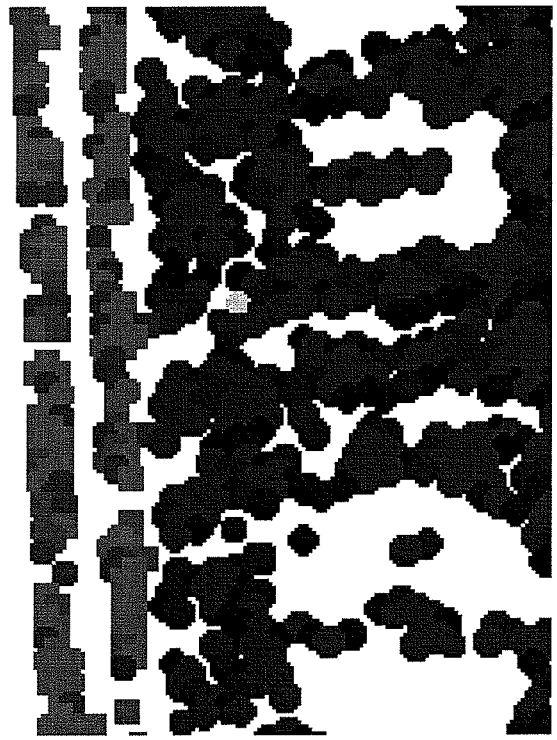
FIG. 7C is an explanatory chart showing an example of a dot pattern rotating angle feature chart.

In FIG. 7C, it is shown that there is a remarkable difference in the dot pattern rotating angle in a wider area (about 30 degrees) on the right side and a thin area (about 0 degree) on the left side.

The dot pattern categorizing module (image area setting module) 25 analyzes the dot pattern feature of the determined dot pattern pixels DP, and classifies the category areas (a plurality of final dot pattern areas) by each dot pattern having a common feature (categorizes dot patterns).

The dot pattern categorizing module (image area setting module) 25 extracts the category areas (dot pattern areas) having the common dot pattern feature based on the references set in advance regarding the calculated dot space and the dot pattern rotating angle, and put those into groups.

Here, the dot pattern categorizing module 25 categorizes the dot pattern pixels DP of FIG. 6B, for example.

Figure 8:
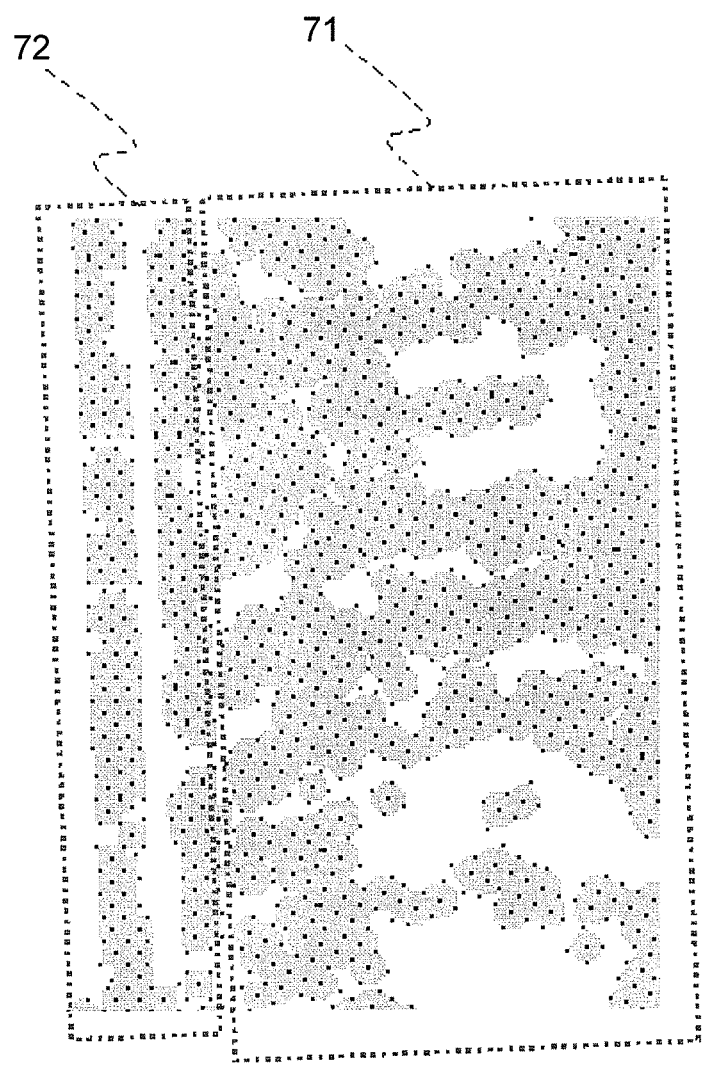
FIG. 8 is an explanatory chart showing a result acquired by categorizing the dot pattern of the image shown in FIG. 7C.

In this case, the dot pattern categorizing module 25 categorizes the dot pattern pixels DP of FIG. 6B into two areas constituted with a dot pattern area of a dot pattern rotating angle 30 degrees with dot space of 4.5 pixels and a dot pattern area of a dot pattern rotating angle 0 degree with dot space of 4.5 pixels. The two categorized areas are defined as a category area 71 and an area 72, respectively, as shown in FIG. 8.

The dot pattern noise area extracting module 26 further examines the dot candidate pixels (neighborhood dot candidate pixels) in the vicinity of the dot pattern pixel group by each of the set category areas, and judges whether or not the neighborhood dot candidate pixels form the dot pattern feature (e.g., a grating-form layout) with the dot pattern pixel group within a same category area (a dot pattern similarity judging function).

When judged that the neighborhood dot candidate pixels have the common dot pattern feature with that of the dot pattern pixel group, the dot pattern noise area extracting module 26 sets the neighborhood dot candidate pixels as the dot pattern pixel group of the category area.

Thereby, the neighborhood dot candidate pixels are also included in the dot pattern pixel group within the same category.

Further, the dot pattern noise area extracting module 26 performs setting for expanding the dot pattern area by each category area, and extracts the dot pattern area set finally as the dot pattern categorized area (a dot pattern categorized area extracting function).

With the dot pattern categorized area extracting function, when the dot candidate pixel in the vicinity of the dot pattern pixel group of each category area is taken as a focused pixel, the dot pattern noise area extracting module 26 sets the focused pixel as the dot pattern pixel group within the category area in a case where the distance between the focused pixel and an arbitrary pixel within the category area and the rotating angle thereof are not in conflict with the dot pattern feature within the category area (setting processing).

Further, the dot pattern noise area extracting module 26 can expand and maximize the dot pattern categorized area set within the same category area by performing the setting processing on each of the dot pattern pixel groups within the category area.

Figure 9A:
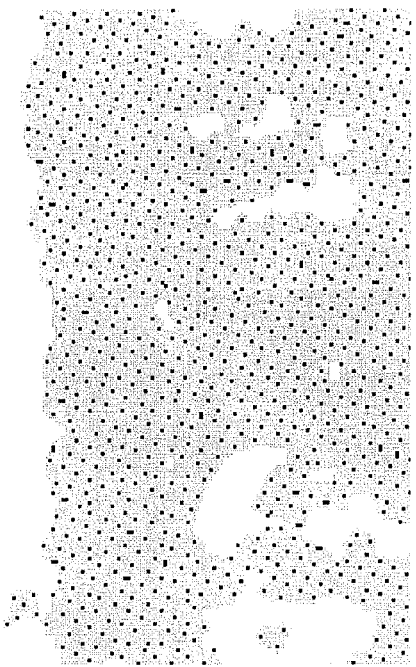
FIG. 9A and FIG. 9B are explanatory chart showing a dot pattern area of each category.
Figure 9B:
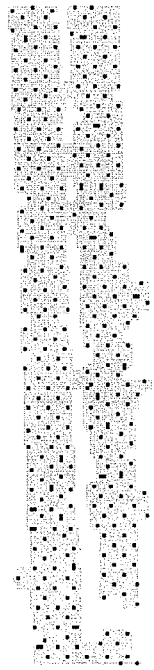

FIG. 9A and FIG. 9B show dot pattern areas DA which correspond to the category areas 71 and 72 of FIG. 8, respectively.

According to those, it is shown that the dot pattern areas DA of FIG. 9A and FIG. 9B are expanded (set) compared to the dot pattern areas of the category areas 71 and 72 shown in FIG. 8, respectively.

The periodic noise removal module (background pattern noise removal module) 27 considers the dot pattern feature in the category area as a periodic noise and removes it by each of the category areas (71, 72) of FIG. 9A and FIG. 9B (a periodic noise removal function).

This periodic noise removal function in this exemplary embodiment is executed by utilizing two-dimensional Fourier transformation disclosed in Non-Patent Document 1.

In Non-Patent Document 1, it is presupposed that a prominent periodic noise has a strong frequency power. Thus, there is such an inconvenience that removal of the periodic noise does not function properly when the frequency power of the periodic noise is weak.

In the meantime, this exemplary embodiment makes it possible to remove only the focused dot pattern noise effectively even when the frequency power of the periodic noise is weak and to decrease generation of a side effect such as deterioration of the ridgeline quality in the area having no periodic noise efficiently through using the dot pattern feature within the category as a restricting condition.

Figure 10:
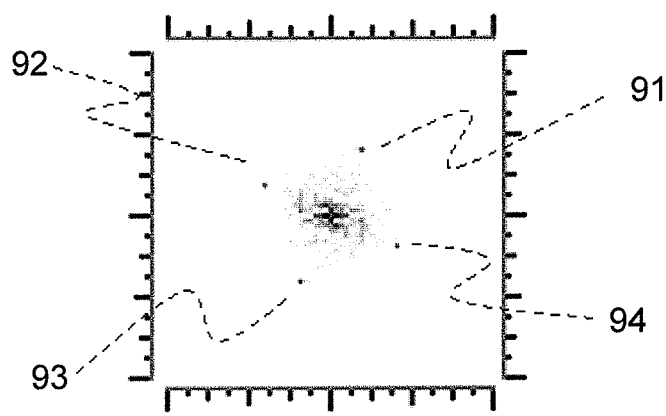
FIG. 10 is an explanatory chart showing a power spectrum of a category area 71.

For example, regarding the dot pattern noise of the dot pattern rotating angle 30 degrees with the period of 4.5 pixels as the dot pattern feature of the category area 71 shown in FIG. 8, the feature thereof appears at the four positions shown as 91 to 94 with power spectra of the Fourier transformation plane as shown in FIG. 10.

Thus, when the Fourier transformation is executed after reducing the power for the vicinity of the pixels (91 to 94), it is possible to accurately remove only the focused dot pattern noise.

Figure 11A:
FIG. 11A is an explanatory image showing a fingerprint image of the category area 71.
Figure 11B:
FIG. 11B is an explanatory image showing a result acquired by removing a periodic background noise from the fingerprint image of the category area 71.

FIG. 11B shows a result (a noise removed image NR) acquired by executing the periodic background removal processing on the fingerprint image of the category area 71 shown in FIG. 11A, for example, based on the periodic noise removal step.

In the fingerprint image of the category area 71 shown in FIG. 11A, there is a dot pattern noise having the same dot pattern feature existing all over the area.

Thus, it is shown in FIG. 11B that the dot pattern noise is effectively removed by performing the periodic noise removal processing that matches the dot pattern noise of FIG. 11A.

The image synthesizing module 28 synthesizes the images from which the dot pattern noise is removed by each category (a noise removed image synthesizing function).

In this processing (the noise removed image synthesizing function), the image synthesizing module 28 synthesizes a noise removed image NR in the dot pattern noise area of a given category area (71 or 72 in this case) and an image right before the periodic noise removal processing is performed as the remaining area.

When there is a large density difference between the focused dot pattern area and the vicinity of the border pixel, it is possible that the image being synthesized (synthesized image) appears unnatural. Thus, it is possible to employ a setting to perform smoothing processing on the border pixels (replaced with average density value of the neighborhood pixel group).

Figure 12:
FIG. 12 is an explanatory image showing a result acquired by performing image synthesizing processing on the fingerprint image of the category area 71.

In a synthesized image GC acquired by synthesizing the noise removed image including the noise removed image NR of the category 71 and the original image (the image before performing the periodic noise removal processing), the dot pattern noise of the focused category is removed properly as shown in FIG. 12.

As described, the dot pattern noise removal module 12 according to the exemplary embodiment includes: the dot candidate pixel extracting module 23 which extracts the pixels to be the candidates for the dot pattern noise from the image; the dot pattern feature extracting module 24 which analyzes the dot candidate pixels and extracts the feature thereof; the dot pattern categorizing module 25 which categorizes each of the dot patterns having the similar feature; the dot pattern area extracting module 26 which extracts the dot pattern areas by each category; the periodic noise removal module 27 which sets the restricting condition that matches the dot pattern feature and remove the dot pattern as the periodic noise by each category; and the image synthesizing module 28 which synthesizes the images from which the dot pattern noise is removed by each category.

The dot pattern noise means a noise of dots (spots) arranged in a grating form at an equal interval.

With this dot pattern noise removal device, it is possible to extract the dot pattern feature from the image where the dot pattern noise exists, to categorize the dot patterns having a common dot pattern feature, to extract the dot pattern noise areas by each of the categorized dot patterns, and to remove the dot pattern as the periodic noise by setting the restricting condition that matches the dot pattern feature by each category.

This makes it possible to enhance and extract the fingerprint ridgelines. Thus, when it is employed for latent fingerprints, judgments thereof by an expert can be done easily since the fingerprint ridgelines from which the dot pattern noise is removed can be displayed.

Further, since the feature can be extracted by using the image from which the dot pattern noise is removed, a still more accurate feature amount can be extracted. Therefore, the accuracy of the fingerprint matching can be improved.

Next, the outline of the operations of the exemplary embodiment will be described.

First, the dot candidate pixel extracting module 23 extracts candidate pixels that constitute a background pattern noise from the pixels within an input image (a fingerprint image) inputted from the outside based on the density of each pixel of the input image (a candidate pixel extracting step).

Then, the dot pattern feature extracting module 24 extracts each candidate pixel and the peripheral neighborhood pixels within a range set in advance in a grating-form positional relation from the extracted candidate pixels as a grating-form layout pixel group (a grating-form extracting/detecting step).

Thereafter, the dot pattern feature extracting module 24 detects layout pattern feature information showing the layout state of the extracted grating-form layout pixel group (a layout feature information detecting step), and the dot pattern categorizing module 25 sets the pixel areas having a common layout pattern by categorizing the grating-form layout pixel group based on the layout pattern feature information (a pixel area setting step).

Then, the periodic noise removal module 27 removes the background pattern noise that matches the layout pattern set for the set pixel areas, respectively, from each of the pixel areas (a background pattern noise removal step).

Note here that the execution contents of the candidate pixel extracting step, the grating-form extracting/detecting step, the layout feature information detecting step, the pixel area setting step, and the background pattern noise removal step may be put into a program to be executed by a computer.

Figure 3:
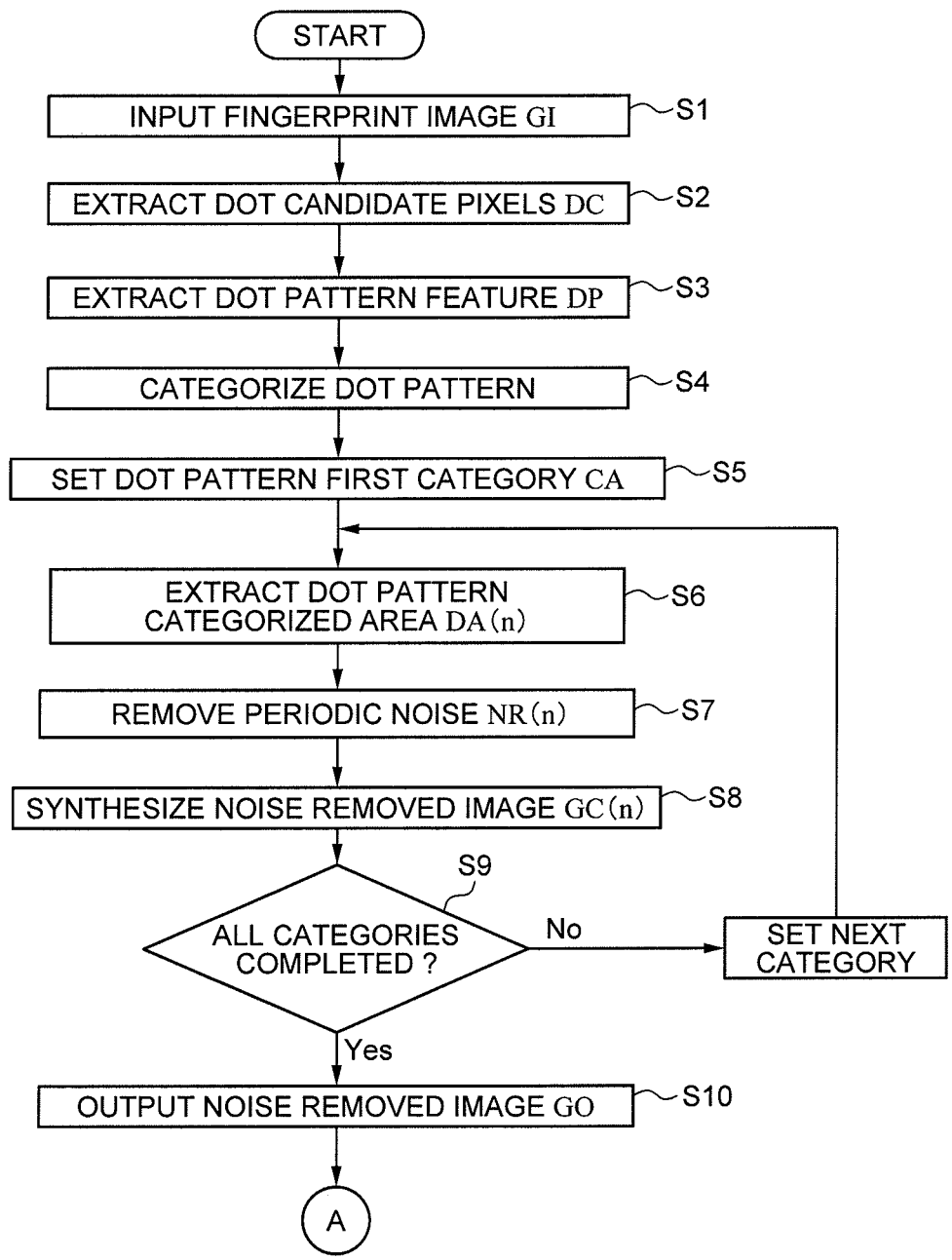
FIG. 3 is a flowchart showing entire action processing steps of the fingerprint processing device disclosed in FIG. 1.

Next, the entire operations of the dot pattern noise removal module 12, the fingerprint image input module 11, and the fingerprint image output module 13 as the exemplary embodiment will be described based on a flowchart of FIG. 3.

First, the fingerprint image input module 11 of the image processing device 10 inputs a fingerprint image to the data processing unit 12 (step S1).

Here, a fingerprint image example inputted to the data processing unit 12 is defined as GI (FIG. 4).

Further, in the digitalized fingerprint image, each of the pixels is digitalized to have density values of 256 gradations from 0 to 255. Furthermore, regarding the density value expression, it is defined with a luminance standard with which the numerical value becomes greater as the luminance becomes greater (brighter).

In this exemplary embodiment, the density value expression is described based on the density standard with which the density value becomes greater as the density becomes greater. Therefore, the ridgeline part with the greater density shows the value close to the maximum value of 255, and a paper and the ridgeline groove with low density show a density value close to 0.

Then, the dot candidate pixel extracting module 23 (FIG. 2) analyzes the density of each pixel of the input image data (GI), and extracts the dot candidate pixels DC that can be the candidates for the dot pattern (step S2: FIG. 3).

In this exemplary embodiment, the density of the input image data is analyzed and the pixels that can be the candidates for the dot pattern are extracted by the processing order (sub-steps 1 to 2) shown below.

First, assuming that a specific pixel among the fingerprint image (input image data) is a focused pixel, the density of the focused pixel is compared and referred with the density of all the neighborhood pixels (e.g., neighboring eight pixels) in the periphery of the focused pixel (density comparison/reference).

When the density value of the focused pixel is greater than or equal to the density values of the neighborhood pixels, the focused pixel (specific pixel) is extracted (sub-step 1).

Then, the dot candidate pixel extracting module 23 analyzes the connectivity of the specific pixel extracted in the sub-step 1, and extracts the specific pixel as the dot candidate pixel DC when the connectivity of the specific pixel is up to 2 pixels.

In the meantime, when the connectivity of the specific pixel is 3 pixels or more, the group of all the connected pixels including the specific pixel is removed (sub-step 2).

The dot candidate pixels DC extracted in the manner described above are shown in FIG. 5A. The dot candidate pixels DC of FIG. 5A shows the result of executing the processing on the enlarged area shown in FIG. 5B based on the processing order (sub-steps 1 to 2).

In FIG. 5B, it is shown that many dots contained in the dot pattern are extracted more accurately compared to the case of FIG. 5A.

Further, since the dot space of the dot pattern printed on a regular check is 8 pixels (0.4 mm in actual distance) or less, for example, extraction of the dot candidate pixels can be done accurately by executing the above-described processing order (sub-steps 1 to 2).

In a case where the dot space in the dot pattern of the processing-target image exceeds 8 pixels, it is also possible to set the comparison-target pixels at the time of the density comparison/reference not only as the nearby distance of 8 pixels but also as the neighborhood pixel group within a still wider range set in advance.

Further, the dot candidate pixel extracting module 23 may be set to generate a contracted image by contracting the fingerprint image into ½, and to extract the dot candidate pixels from the contracted image by the above-described procedure.

Furthermore, the dot candidate pixel extracting module 23 may be set to extract the center pixel through performing image contraction or core line extraction on the fingerprint image instead of removing the group of all the pixels having the connectivity of 3 pixels or more in the sub-step 2.

Then, the dot pattern feature extracting module 24 analyzes the dot candidate pixels DC, and judges whether or not the relation between each of the dot candidate pixels and the neighborhood pixels thereof can be considered as being in a grating-form layout relation.

When the relation between each of the dot candidate pixels and the neighborhood pixels thereof can be considered as being in a grating-form layout relation, the dot pattern feature extracting module 24 extracts the dot space and the tilt of the grating-form layout (dot pattern rotating angle) as the dot pattern feature (step S3: a dot pattern feature extracting step (FIG. 3)).

The dot pattern feature extracting step will be described in details based on FIG. 6A, FIG. 6B, and FIG. 7A to FIG. 7C.

The judgment regarding whether or not the relation between the specific pixels within the inputted image (dot candidate pixels DC) and the neighborhood pixels thereof can be considered as being in a grating-form layout relation set in advance is done through executing the following processing order (sub-steps 3 to 4) by the dot pattern feature extracting module 24.

First, assuming that a specific pixel (dot candidate pixel) is a focused pixel (a focused pixel 61 of FIG. 6A in this case), the dot pattern feature extracting module 24 determines the closest dot candidate pixel within a distance of 8 pixels from the focused pixel (this pixel is defined as a closest neighborhood pixel 62 in this case).

When there is no pixel within the neighboring distance of 8 pixels from the specific pixel, it is judged that the specific pixel is not in a grating-form layout (sub-step 3).

Then, the dot pattern feature extracting module 24 checks whether or not there are other dot candidates at positions which are equivalent distance with respect to the focused pixel 61 and the closest pixel 62 and are rotated by 90 degrees, 180 degrees, and 270 degrees (referred to as "rotated positions" hereinafter).

When there are dot candidate pixels existing within the rotated positions, the focused pixel 61 satisfies the grating-form layout with tilt (satisfies a grating-form layout condition). Thus, the dot pattern feature extracting module 24 can consider those pixels to be in a grating-form layout, and set (determine) the focused pixel 61 and the four neighborhood pixels 62, 63, 64, and 65 as the dot pattern structural pixels (sub-step 4).

FIG. 6B shows the result acquired by executing the processing on the dot candidate pixels DC of FIG. 5A based on the above-described processing order (sub-steps 3 to 4). In FIG. 6B, it is shown that the dot candidate pixels existed in FIG. 5A are removed from the area of the fingerprint ridgeline and the printed character part.

Then, the dot pattern feature extracting module 24 calculates the dot space of the dot pattern pixels DP (FIG. 6B) as the dot pattern feature. Note here that the dot space of all the dot pattern pixels in the dot pattern pixels DP (FIG. 6B), for example, is about 4.5 pixels.

Further, the dot pattern feature extracting module 24 determines the dot pattern rotating angle as the dot pattern feature of the dot pattern pixels DP (FIG. 6B) (the dot pattern rotating angle defining function).

Note here that the dot pattern rotating reference angle as the reference of the dot pattern rotating angle is defined as 0 degree when the four neighborhood pixels are placed in a grating form horizontally and vertically as shown in FIG. 7A, and the dot pattern rotating angle is defined as the tilt (angle) with respect to that.

This tilt is defined as a clockwise rotating angle.

The dot pattern rotating angle in FIG. 7B is 30 degrees on the basis of the dot pattern rotating reference angle (FIG. 7A).

Then, the dot pattern categorizing module 25 analyzes the dot pattern feature of the determined dot pattern pixels DP, and categorizes those by each dot pattern having a similar feature (step S4: categorize dot pattern).

The dot pattern categorizing method according to the exemplary embodiment extracts the category areas having the similar calculated dot space and dot pattern rotating angle and puts those into groups based on the references set in advance.

Here, the dot pattern categorizing module 25 categorizes the dot pattern pixels DP of FIG. 6B, for example.

In this case, the dot pattern categorizing module 25 categorizes the dot pattern pixels DP of FIG. 6B into two areas constituted with a dot pattern area of a dot pattern rotating angle 30 degrees with dot space of 4.5 pixels and a dot pattern area of a dot pattern rotating angle 0 degree with dot space of 4.5 pixels. The two categorized areas are defined as the category area 71 and the area 72, respectively, as shown in FIG. 8.

Then, the data processing control module 21 sets the dot pattern area of the category area 71 as a first processing-target category area (step S5: set a dot pattern first category).

Then, the dot pattern noise area extracting module 26 further examines the dot candidate pixels (neighborhood dot candidate pixels) in the vicinity of the dot pattern pixel group by each of the category areas, and judges whether or not the neighborhood dot candidate pixels form a dot pattern similar to the dot pattern pixel group within a same category area (the dot pattern similarity judging function).

When judged that the neighborhood dot candidate pixels have the similar dot pattern with that of the dot pattern pixel group, the dot pattern noise area extracting module 26 sets the neighborhood dot candidate pixels as the dot pattern pixel group of the category area.

Thereby, the neighborhood dot candidate pixels are also included in the dot pattern pixel group within the same category.

As described, the dot pattern noise area extracting module 26 performs setting for expanding the dot pattern area by each category area, and extracts the dot pattern area set finally as the dot pattern categorized area (step S6: a dot pattern categorized area extracting step).

Further, assuming the neighborhood dot candidate pixel of the dot pattern pixel group of each category area as the focused pixel in the dot pattern categorized area extracting step, the dot pattern noise area extracting module 26 sets the focused pixel as the dot pattern pixel group within the category area when the distance and the rotating angle of an arbitrary pixel within the category area with respect to the focused pixel are not conflicted with the dot pattern feature within the focused pixel (setting processing).

Through performing the above-described setting processing on each of the dot pattern pixel groups within the category areas by the dot pattern noise area extracting module 26, the dot pattern categorized area set within the same category area can be expanded and maximized.

FIG. 9A and FIG. 9B show dot pattern areas DA which correspond to the category areas 71 and 72 of FIG. 8, respectively.

According to those, it is shown that the dot pattern areas DA of FIG. 9A and FIG. 9B are expanded (set) compared to the dot pattern areas of the category areas 71 and 72 shown in FIG. 8, respectively.

The periodic noise removal module 27 considers the dot pattern feature in the category area as a periodic noise and removes it by each of the category areas (71, 72) of FIG. 9A and FIG. 9B (step S7: a periodic noise removal step).

As described above, this periodic noise removal step is executed by utilizing two-dimensional Fourier transformation disclosed in Non-Patent Document 1.

Then, the image synthesizing module 28 synthesizes the images from which the dot pattern noise is removed by each category (step S8: synthesize noise removed images).

In this processing, the image synthesizing module 28 synthesizes a noise removed image NR in the dot pattern noise area of a given category area (71 or 72 in this case) and an image right before the periodic noise removal processing is performed as the remaining area.

When there is a large density difference between the focused dot pattern area and the vicinity of the border pixel, it is possible that the image being synthesized (synthesized image) appears unnatural. Thus, it is possible to employ a setting to perform smoothing processing on the border pixels (replaced with average density value of the neighborhood pixel group).

In a synthesized image GC acquired by synthesizing the noise removed image including the noise removed image NR of the category 71 and the original image (the image before performing the periodic noise removal processing), the dot pattern noise of the focused category is removed properly as shown in FIG. 12.

Then, the data processing control module 21 judges whether or not there is a dot pattern area of a next category (step S9: all categories completed?)

When there is a dot pattern area of a next category area (e.g., the category area 72), the next category area is set (to step S6: NO). In the meantime, when there is no dot pattern of a next category area, the procedure is advanced to noise removed image output processing (to step S10: YES).

Figure 13A:
FIG. 13A is an explanatory image showing a fingerprint image of the category area 72.
Figure 13B:
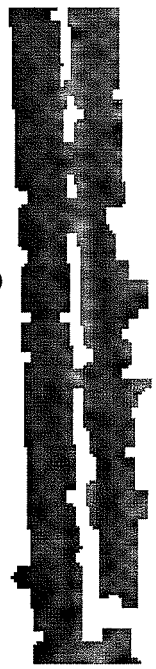
FIG. 13B is an explanatory image showing a result acquired by removing a periodic background noise from the fingerprint image of the category area 72.
Figure 13C:
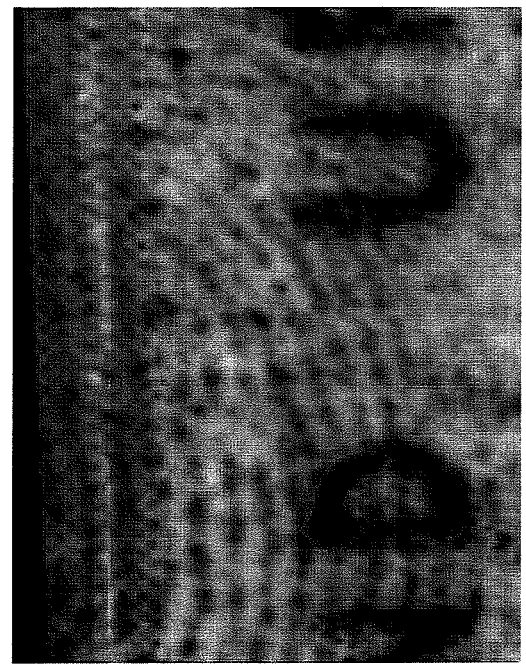
FIG. 13C is an explanatory image showing a result acquired by performing image synthesizing processing on the fingerprint image of the category area 72.

Note here that FIG. 13A is a fingerprint image corresponding to the second category area 72, FIG. 13B is a noise removed image corresponding to the second category area 72, and FIG. 13C is a synthesized image GC2 acquired by synthesizing the noise removed image corresponding to the second category area 72 with the synthesized image GC (FIG. 12).

In FIG. 13C, it is shown that only the focused dot pattern noise is removed aptly as in the case of the noise removed image shown in FIG. 13B through reducing the Fourier power spectrum that matches the dot pattern noise property, i.e., the period of 4.5 pixels and the dot pattern angle of 0 degree as the dot pattern feature even in the category area 72.

Then, the data processing control module 21 outputs an image GO from which the dot pattern noise is removed (step S10: FIG. 3). This image GO in this exemplary embodiment is the synthesized image GC2 that corresponds to the dot pattern area of the last category. Other than the monitor and the printer, the synthesized image GO may also be outputted to the matching device 14 or the like including a feature extracting mechanism.

While this exemplary embodiment is described by referring to a case of a fingerprint image, the present invention can also be applied to palm prints having similar patterns as those of fingerprints.

As described above, the image processing device 10 as the exemplary embodiment of the invention can categorize the image into each of the dot patterns having the similar feature, extract the dot pattern areas by each category, and then remove the dot pattern feature as the periodic noise by each category.

Therefore, even when a fingerprint ridgeline remains on the dots of a check, a picture area of a newspaper, or the like, for example, extraction of the fingerprint ridgeline in the input image (latent fingerprint) can be done easily.

Further, when it is applied to a case of a latent fingerprint, it is possible to limit the target to be within the dot pattern noise area and to remove the noise that matches the feature of the dot pattern noise existing therein. This makes it possible to suppress an influence upon the area other than the dot pattern area imposed by the noise removal processing and to remove the dot noise effectively.

Thereby, the fingerprint ridgelines from which the dot pattern noise is removed can be extracted and displayed effectively, so that judgments thereof by an expert can be done easily.

Further, since the feature can be extracted by using the image from which the dot pattern noise is removed, a more accurate feature amount can be extracted. This makes it possible to improve the accuracy of fingerprint matching.

While the present invention has been described heretofore by referring to the embodiments (and EXAMPLES), the present invention is not limited only to the embodiments (and EXAMPLES). Various changes and modifications occurred to those skilled in the art can be applied to the structures and details of the present invention without departing from the scope of the present invention.

This Application claims the Priority right based on Japanese Patent Application No. 2009-121042 filed on May 19, 2009 and the disclosure thereof is hereby incorporated by reference in its entirety.

INDUSTRIAL APPLICABILITY

The present invention can effectively be applied to a system which detects and identifies a target and a moving object within a digital image by analyzing the digital image.

REFERENCE NUMERALS

10 Fingerprint processing device
11 Fingerprint image input module
12 Dot pattern noise removal module
13 Fingerprint image output module
14 Matching device
21 Data processing control module
22 Data storage module (storage device)
23 Dot candidate pixel extracting module (candidate pixel extracting module)
24 Dot pattern feature extracting module (grating-form layout pixel extracting module, layout feature information detecting module)
25 Dot pattern categorizing module (image area setting module)
26 Dot pattern area extracting module
27 Periodic noise removal module (background pattern noise removal module)
28 Image synthesizing module

The invention claimed is:

1. A pattern noise removal device which removes a background pattern noise having periodicity from a digital image, the pattern noise removal device comprising:
a candidate pixel extracting module configured to extract candidate pixels that constitute the background pattern noise from pixels within the image based on density of each of the pixels;
a dot pattern feature extracting module configured to extract a feature of a dot pattern formed by each of the candidate pixels and peripheral neighborhood pixels among the extracted candidate pixels;
a dot pattern area extracting module configured to extract a dot pattern area including the periodic candidate pixels and neighborhood pixels having the feature of the dot pattern;
a dot pattern categorizing module configured to, in a case of the feature of the dot pattern having tilt on the horizontal and vertical coordinates, analyze the feature of the dot pattern extracted by the dot pattern feature extracting module by each of the dot pattern areas extracted by the dot pattern area extracting module, and classify a plurality of dot pattern areas by each feature of the dot pattern through assembling the dot pattern area having a common dot pattern feature, with a restricting condition which is the dot pattern feature different by each dot pattern area; and a periodic pattern noise removal module configured to acquire, by having the dot pattern area classified by the dot pattern categorizing module as unit, information of the dot pattern area extracted by the dot pattern area extracting module and information of the feature of the dot pattern extracted by the dot pattern feature extracting module and remove a plurality of dot candidate pixels included in the dot pattern area as the dot pattern noise by having the feature of the dot pattern as the restricting condition.

2. The dot pattern noise removal device as claimed in claim 1, wherein
the candidate pixel extracting module is configured to extract the candidate pixels based on the density by taking distance between the candidate pixels and the peripheral pixels and continuity of the candidate pixels into consideration.

3. The dot pattern noise removal device as claimed in claim 1, wherein
the dot pattern feature extracting module is configured to extract the dot pattern feature by taking tilt on horizontal and vertical coordinates as an element of the dot pattern feature.

4. The dot pattern noise removal device as claimed in claim 1, wherein
the dot pattern feature extracting module is configured to extract a layout relation of the periodic pixels that form the background pattern noise as the dot pattern feature.

5. A pattern noise removal method for removing a background pattern noise having periodicity from a digital image, comprising:
extracting candidate pixels that constitute the background pattern noise from pixels within the image based on density of each of the pixels;
extracting a feature of a dot pattern formed by each of the candidate pixels and peripheral neighborhood pixels among the extracted candidate pixels;
extracting a plurality of dot pattern areas including the periodic candidate pixels and neighborhood pixels having the feature of the dot pattern;
in a case of the feature of the dot pattern having tilt on the horizontal and vertical coordinates, analyzing the extracted feature of the dot pattern by each of the extracted dot pattern areas, and classifying a plurality of dot pattern areas by each feature of the dot pattern through assembling the dot pattern area having a common dot pattern feature, with a restricting condition which is the dot pattern feature different by each dot pattern area; and
acquiring, by having the classified dot pattern area as unit, information of the extracted dot pattern area and information of the extracted feature of the dot pattern, and removing a plurality of dot candidate pixels included in the dot pattern area as the dot pattern noise by having the feature of the dot pattern as the restricting condition.

6. The pattern noise removal method as claimed in claim 5, comprising:
classifying the extracted plurality of dot pattern areas into category areas by each common dot pattern feature; and
synthesizing images from which the background pattern noise is removed into a single image by each of the classified category areas.

7. The dot pattern noise removal method as claimed in claim 5, wherein
the candidate pixels are extracted based on the density by taking distance between the candidate pixels and the peripheral pixels and continuity of the candidate pixels into consideration.

8. The dot pattern noise removal method as claimed in claim 5, comprising
extracting a layout relation of the periodic pixels that form the background pattern noise as the dot pattern feature.

9. A non-transitory recording medium storing a pattern noise removal program for removing a background pattern noise having periodicity from a digital image, the program causing a processor of a computer to execute:
   a function of extracting candidate pixels that constitute the background pattern noise from pixels within the image based on density of each of the pixels;
   a function of extracting a feature of a dot pattern formed by each of the candidate pixels and peripheral neighborhood pixels among the extracted candidate pixels;
   a function of extracting a dot pattern area including the periodic candidate pixels and neighborhood pixels having the feature of the dot pattern;
   in a case of the feature of the dot pattern having tilt on the horizontal and vertical coordinates, a function of analyzing the extracted feature of the dot pattern by each of the extracted dot pattern areas, and classifying a plurality of dot pattern areas by each feature of the dot pattern through assembling the dot pattern area having a common dot pattern feature, with a restricting condition which is the dot pattern feature different by each dot pattern area; and
   a function of acquiring, by having the classified dot pattern area as unit, information of the extracted dot pattern area and information of the extracted feature of the dot pattern, and removing a plurality of dot candidate pixels included in the dot pattern area as the dot pattern noise by having the feature of the dot pattern as the restricting condition.

* * * * *